(12) United States Patent
Ma et al.

(10) Patent No.: US 8,572,752 B2
(45) Date of Patent: Oct. 29, 2013

(54) METHOD AND DEVICE FOR RIGHTS MANAGEMENT

(75) Inventors: Fulong Ma, Shanghai (CN); Jin Qu, Shanghai (CN)

(73) Assignee: Koninklijke Philips N.V., Eindhoven (NL)

( * ) Notice: Subject to any disclaimer, the term of this patent is extended or adjusted under 35 U.S.C. 154(b) by 1142 days.

(21) Appl. No.: 12/158,713

(22) PCT Filed: Dec. 22, 2006

(86) PCT No.: PCT/IB2006/055015
§ 371 (c)(1),
(2), (4) Date: Jun. 23, 2008

(87) PCT Pub. No.: WO2007/074420
PCT Pub. Date: Jul. 5, 2007

(65) Prior Publication Data
US 2008/0304665 A1    Dec. 11, 2008

(30) Foreign Application Priority Data

Dec. 26, 2005  (CN) .......................... 2005 1 0134130

(51) Int. Cl.
*G06F 17/30* (2006.01)
(52) U.S. Cl.
USPC ................................. 726/26; 705/51; 705/52
(58) Field of Classification Search
USPC ........... 726/26–33; 380/200–202; 705/50–54; 713/193
See application file for complete search history.

(56) References Cited

U.S. PATENT DOCUMENTS

| 6,895,503 | B2 * | 5/2005 | Tadayon et al. | 713/168 |
| 6,999,947 | B2 * | 2/2006 | Utsumi et al. | 705/59 |
| 7,617,540 | B2 * | 11/2009 | Kim et al. | 726/26 |
| 7,720,767 | B2 * | 5/2010 | Ta et al. | 705/59 |
| 7,734,917 | B2 * | 6/2010 | Chang et al. | 713/167 |
| 7,774,280 | B2 * | 8/2010 | Nguyen et al. | 705/59 |
| 7,801,822 | B2 * | 9/2010 | Mori et al. | 705/59 |
| 7,979,864 | B2 * | 7/2011 | Meguro | 718/104 |

(Continued)

FOREIGN PATENT DOCUMENTS

| EP | 1509024 A2 | 2/2005 |
| EP | 1622060 A1 | 2/2006 |
| WO | 0163822 A2 | 8/2001 |
| WO | 2005046160 A1 | 5/2005 |

OTHER PUBLICATIONS

Jaehong Park, et al: Towards an Engineering Framework for Usage Control and Digital Rights Management, The Laboratory for Information Security Technology (LIST) ISE Department , MS4A4, George Mason University, pp. 1-17, 2001.

(Continued)

*Primary Examiner* — Nirav B Patel

(57) ABSTRACT

A method of rights management in a first device connected to digital data content, said first device comprising a right for accessing said digital data content and available state information for reflecting the state of use of said digital data content, said method comprising the steps of: —receiving by said first device a request for a state information from a second device; —comparing the content of said request with said available state information; —selecting said requested state information in said available state information according to the result of said comparing step; —transferring said requested state information to said second device via a communication channel; and—duplicating said fight to said second device.

9 Claims, 3 Drawing Sheets

(56) References Cited

U.S. PATENT DOCUMENTS

| | | |
|---|---|---|
| 2002/0013772 A1 | 1/2002 | Peinado |
| 2002/0184517 A1* | 12/2002 | Tadayon et al. ............... 713/200 |
| 2003/0135466 A1* | 7/2003 | Wang et al. ..................... 705/51 |
| 2004/0078338 A1* | 4/2004 | Ohta et al. ...................... 705/51 |
| 2004/0103303 A1* | 5/2004 | Yamauchi et al. ............ 713/200 |
| 2005/0060571 A1 | 3/2005 | Wang et al. |
| 2005/0137984 A1 | 6/2005 | Nguyen et al. |
| 2006/0031164 A1* | 2/2006 | Kim ................................ 705/51 |
| 2007/0219917 A1* | 9/2007 | Liu et al. ......................... 705/59 |
| 2008/0147530 A1* | 6/2008 | Kwan et al. ..................... 705/34 |

OTHER PUBLICATIONS

Cover Pages, Oasis: Open Mobile Alliance Releases Working Drafts for OMA DRM Version 2.0., May 31, 2004, Online Resource for Markup Language Technologies, pp. 1-16.

* cited by examiner

— METHOD AND DEVICE FOR RIGHTS MANAGEMENT

FIELD OF THE INVENTION

The invention relates to a method and device of a rights management of digital data content and, more particularly, for sharing digital data content between different devices.

BACKGROUND OF THE INVENTION

Digital Rights Management system (DRM) is the technology to control the use of digital content and protect digital content against illegal distribution and copy. In a DRM system, the content is encrypted by the content encryption key (CEK) and then the encrypted content is transmitted to a device of the user who buys the content. In addition, there are rights associated with the content, which describe what the user can do with the content. Only an authorized user can receive the encrypted content, the content key and the rights by using his/her compliant devices. Stateful Rights are right objects for which the device has to explicitly maintain state information, so that the constraints and permissions expressed in the right objects can be enforced correctly. Examples of stateful rights may be "play a piece of content three times", "play a piece of content within 30 days" or "print the e-book within 30 days".

Nowadays, users have more and more digital CE devices and want to enjoy the digital data content conveniently in multiple devices or one device as the consumer pleases. In other words, it is desirable to share stateful rights among different devices without violating the rule of use. However, a current DRM system does not provide a flexible method for sharing stateful rights.

According to DRM Specification V2.0 of OMA (Open Mobile Alliance), if a right issuer issues a stateful right associated with a piece of content to a specific device, the content and the stateful right can only be used in the device. The state information about, for example, how many times the content has been consumed, should be kept in the device. If the user also wants to access this content from another device, then the user has to buy the content with a stateful right from the right issuer.

Another option in an OMA DRM V.2.0 mechanism is to form an authorization domain by grouping a set of devices. The devices in a domain may share a same right meaning that if a device obtains a stateful right from a rights issuer, say "play three times", any other device in this domain has the same right "play three times". But any state information about how many times the content has been consumed in each device shall not be shared between devices. It means that the content can only be consumed in each device in the domain independently. Therefore, the method cannot provide the flexibility and convenience to use content in different devices as the consumer pleases. Patent application US 2005/0060571 A1 discloses a method for transferring rights adapted to be associated with items from a rights supplier to a right consumer. However, it requires a unified state-of-rights manager, thus all the devices must be online or in other words, must have access to the state-of-rights manager. It does not provide a solution to content sharing among devices that are not on line. Another problem of this invention is that it allows a device to generate a new right that causes a risk of leaking, thereon embezzling the signature of the Rights Issuer who signs the right of the piece of the content.

OBJECT AND SUMMARY OF THE INVENTION

It is an object of the invention to propose an improved method of rights management in a device in order to share digital data content among devices, whereas the right itself does not change.

The object is achieved in a method of rights management in a first device connected to digital data content, said first device comprising a right for accessing said digital data content and available state information for reflecting the state of use of said digital data content, said method comprising the steps of receiving by said first device a request for state information from a second device; comparing the content of said request with said available state information; selecting said requested state information in said available state information according to the result of said comparing step; transferring said requested state information to said second device via a communication channel; and duplicating said right to said second device.

This object is also achieved in a first device for rights management connected to digital data content comprising a right for accessing said digital data content and available state information for reflecting the state of use of said digital data content, said first device further comprising receiving means for receiving by said first device a request for state information from a second device; comparing means for comparing the content of said request with said available state information; selecting means for selecting said requested state information in said available state information according to the result of said comparing step; transferring means for transferring said requested state information to said second device via a communication channel; and duplicating means for duplicating said right to said second device.

Therefore, this invention provides a rights management method, in which the content may be conveniently shared among devices. At the same time, the integrity of the rights is protected.

Other objects and attainments together with a full understanding of the invention will become apparent and appreciated by referring to the following description and claims in conjunction with the accompanying drawings.

BRIEF DESCRIPTION OF THE DRAWINGS

In these figures identical parts are identified by identical references.

DETAILED DESCRIPTION OF THE INVENTION

Figure 1:
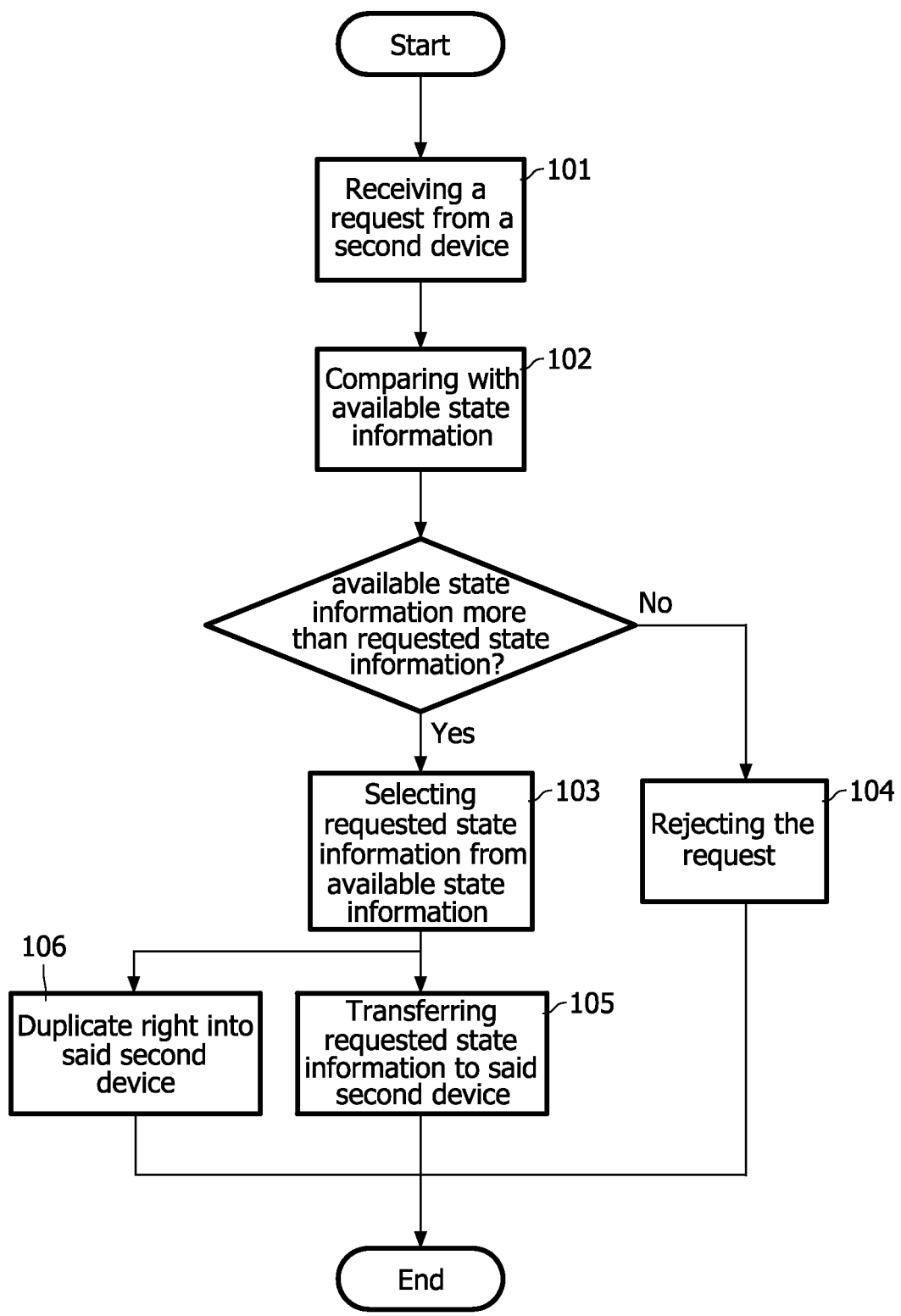
FIG. 1 shows a flowchart of a rights management method according to the invention.

FIG. 1 shows a flowchart of a rights management method according to the invention.

This invention provides a method of rights management in a first device connected to digital data content, said first device comprising a right for accessing said digital data content and available state information for reflecting the state of use of said digital data content, said method comprising the step of receiving 101 by said first device a request for state information from a second device.

Initially, the first device (such as PC, PDA, TV etc.) gets a right from a right issuer who normally could be the service provider, and digital data content (e.g. the downloaded digital music). The digital data content is encrypted with a Content Encryption Key (CEK) and the right comprises the CEK. In this invention, the right is a stateful right. The stateful right has some constraints to the content, for example the number of times or the time interval; the content can be played back. The state information should be associated with the stateful right to indicate to what extent the content has been used. The state information associated with the right must be maintained and managed in the first device, so that the right can be used properly according to the constraints of the stateful right in the first device. The integrity of the state information should be protected, so that only the authorized DRM (Digital Rights management) agent in the device can change the usage state. The first device creates the available state information and the available state information changes its value to reflect the content state of use. For example, if the content has been used once, the value of the state information will diminish once.

Suppose the first device gets a stateful right, for example, "play 10 times". The second device (such as an MP3) also wants to get the right for playing the content of the first device, then the second device may send a request to the first device, for example, "play 4 times". In step 101 the first device receives the request "play 4 times". In this invention, the devices that request state information may be multiple.

This method also comprises the step 102 of comparing the content of said request with said available state information. In step 102, the first device will compare the content of said request with said available state information to check if the available state information can meet the requirement of the request.

This method also comprises the step 103 of selecting said requested state information in said available state information according to the result of said comparing step 102. If the available state information is more than the requested state information (available state information "10 times" is more than "4 times"), then in step 103, requested state information ("4 times") is selected in available state information. If the available state information is less than the requested state information, then the first device rejects the request in step 104.

This method also comprises the step 105 of transferring said requested state information to said second device via a communication channel. Subsequently, in step 105, the first device transfers said requested state information ("4 times") to said second device via a communication channel. The communication channel can be a wired or wireless channel.

This method also comprises the step 106 of duplicating said right to said second device. Finally in step 106, the right is duplicated to the second device, so that the integrity of the right is protected: the right is the right issued and signed by the service provider and the first device does not issue a new right.

Additionally, said first device may comprise a right encryption key, therefore the invention provides a method comprising the step (not shown) of transferring said right encryption key to said second device via said communication channel. The CEK in the right might be encrypted with the Rights Encryption Key (REK), which aims to enhance the security of the content and the CEK. Then, in order to get the encrypted CEK and decrypt thereon the content, the second device needs the REK. Therefore, the first device sends the REK to said second device via said communication channel.

The digital data content might be kept on the first device or in a remote server, in the former situation, the first device transfers said digital data content to said second device via said communication channel. Therefore, this invention provides a method comprising the step of transferring said digital content to said second device via said communication channel.

This invention also provides a method comprising the step of securing said communication channel meaning that the first device and second device establish a secure authentication channel (SAC). Then the requested state information (e.g. "play 4 times") transferring from the first device to the second device and the REK may transfer via the SAC. As an example, the SAC can be established by using Public Key Infrastructure (PKI) authentication and key exchange protocol, which can be performed according to ISO/IEC standard, Information Technology—Security techniques—Key Management, ISO/IEC 11770.

This invention also provides a method comprising the step of protecting the integrity of the state information not selected by said selecting step 103. Said state information may be called non-selected state information, i.e. residual state information. When requested state information has been selected, the integrity of the non-selected state information ("6 times" in the example above) should be protected, meaning that it should not be modified without authorization. The method for protecting the integrity of non-selected available state information may comprise, for example, digital signing of said non-selected available state information by the first device or use so called "hash function". The digital signing can be performed according to the standard, for example, Digital Signature Standard (DSS) [FIPS 186, 1994]. Another possible method is to compute the hash value of the state information and store the hash value in a secure storage. As a consequence, the integrity of the state information can be protected by verifying the signature of the state information according to the signing method used, for example DSS. If the method of securely storing the hash value is used, the integrity verification can be simply achieved by computing a new hash value of the state information and comparing the new hash value with the old hash value stored in the secure storage. If the two values differ, it means that the state information was changed.

Similarly, this method also comprises the step of protecting the integrity of said requested state information by said second device. When the requested state information has been transferred to the second device, the integrity of said requested state information should be protected, meaning that it should not be modified without authorization. The method for protecting the integrity of said request state information may, for example, comprise digitally signing said requested state information by the second device or use a hash value, as illustrated above.

Additionally, this invention also provides a method of rights management, wherein said second device comprises a second right duplicated from said first device and second state information for reflecting the state of use of said digital data content, said method further comprising the steps of verifying by said second device that said second right and said second state information is not modified without authorization. For example, if the second device has already played once, the second state information (remainder state information) "3 times" in the second device may return to the first device. Before the second device sends state information to the first device for merging, the second device verifies said second right and said second state information to ensure that the said second right and second state are not modified without authorization.

This method also comprises the step of returning at least part of said second state information by said second device to said first device via said communication channel according to the result of said verification step. If said second right and said second state information is not modified without authorization, said second device should be capable of returning all its state information to said first device. Obviously, the second device may also return part of the state information, such as "2 times".

This invention also provides a method comprising the step of removing said right from said second device. Under the situation that the second device returns all its state information to the first device, it should not reserve a right, so the right is removed from the second device.

Figure 2:
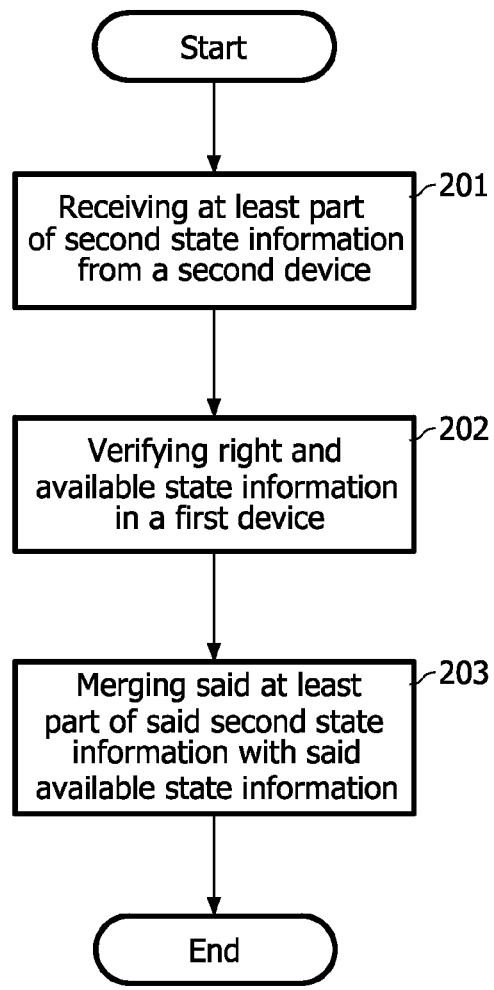
FIG. 2 shows a flowchart of another rights management method according to the invention.

FIG. 2 shows a flowchart of another rights management method according to the invention.

This invention provides a method of receiving 201 from said second device said at least part of second state information by said first device. As illustrated above, the second device may return all or part of its state information to the first device; correspondingly, the first device receives said at least part of state information from said second device. Still continue the example above, if the second device return the state "3 times" to the first device, then firstly in step 201, the first device receives state information "3 times".

This method also comprises the verification step 202 by said first device that said right and said available state information is not modified without authorization. Subsequently, in step 202, the first device verifying both said right and said available state information is not modified without authorization.

This method also comprises the step 203 of merging said at least part of said second state information with said available state information according to the result of said verification step 202. If the verifying result in step 202 is positive, finally in step 203, the first device merges "3 times" and the available state information "6 times" to produce a new state "9 times". In addition, the first device may also previously have played certain times, for example "2 times"; then the available state information in the first device is "4 times", as a result the new state information is "7 times".

Figure 3:
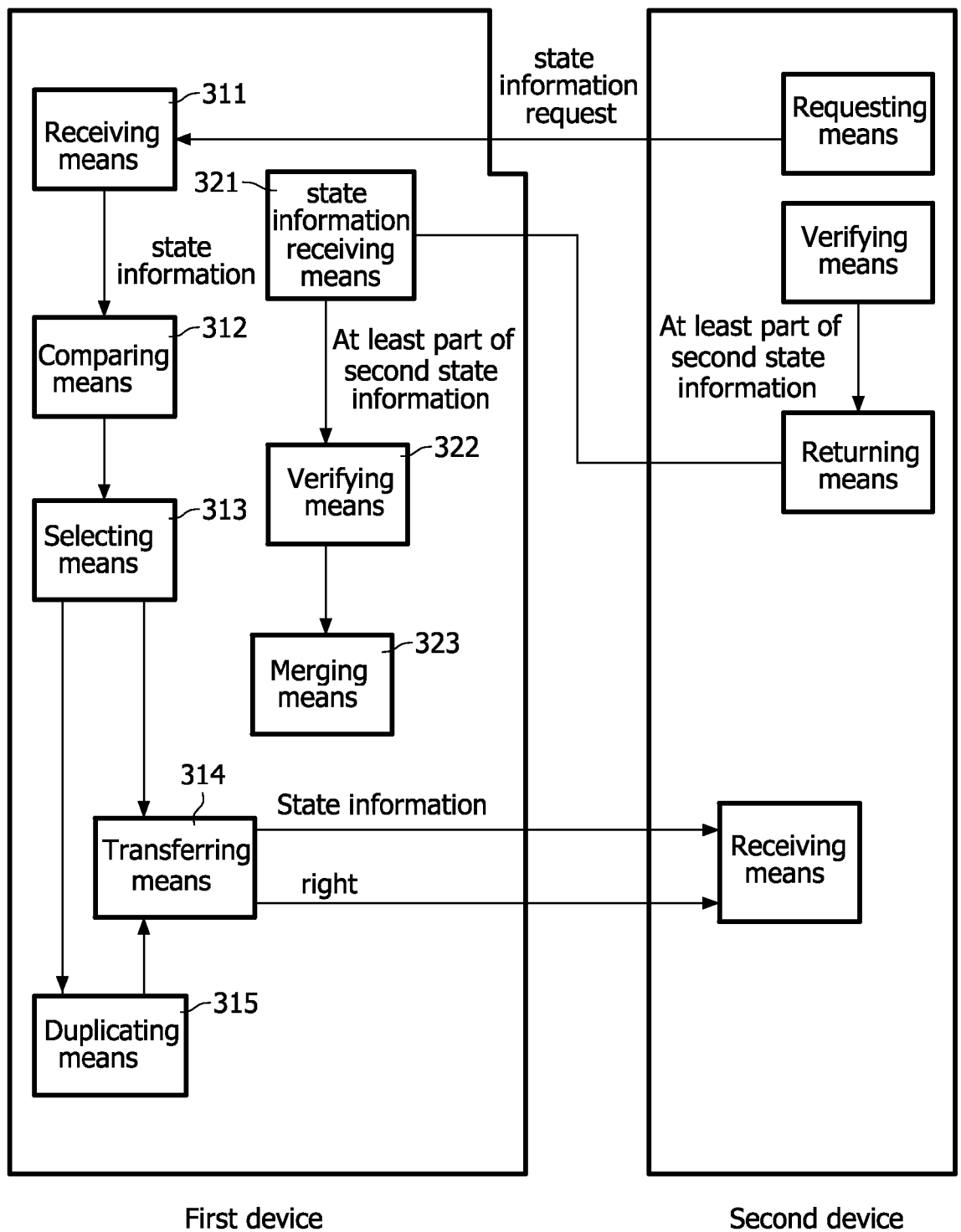
FIG. 3 represents a system for rights management according to the invention.

FIG. 3 represents a system for rights management according to the invention.

This invention proposes a first device of rights management connected to a data content comprising a right for accessing said digital content and available state information for reflecting the state of use of said digital data content, said first device further comprising receiving means 311 for receiving by said first device a request state information from a second device; comparing means 312 for comparing the content of said request with said available state information; selecting means 313 for selecting said requested state information in said available state information according to the result of said comparing step; transferring means 314 for transferring said requested state information to said second device via a communication channel; and duplicating means 315 for duplicating said right to said second device.

This invention also proposes a first device for rights management further comprising receiving means 321 for receiving by said first device from said second device said at least part of second state information; verification means 322 for verifying by said first device that said right and said available state information is not modified without authorization; and merging means 323 for merging said at least part of said second state information with said available state information according to the result of said verification step 202.

The function blocks 311 and 312 are separately illustrated in FIG. 3, but they may be the same means in practice.

It will be noted that the embodiments of the present invention described above are intended to be taken in an illustrative and not a limiting sense. Various modifications may be made to these embodiments by those skilled in the art without departing from the scope of the present invention.

The invention claimed is:

1. A method of digital rights management in a first device of digital data content the first device is connected to least one second device via a communication channel, said method comprising acts of:
   providing to said first device digital rights for accessing said digital data content and an available amount of access to said digital data content;
   said first device:
      receiving a request for a portion of the amount of access to the digital data content from second device;
      when the requested portion of the amount of access is within said available amount of access,
         deducting said requested portion of the amount of access from said available amount of access,
         transferring said requested amount of access to aid second device via the communication channel,
      duplicating said digital right for accessing said digital data content to said second device as a second digital right,
         verifying, by said second device, that said second digital right and an amount of access by the second device are not modified without authorization,
         deducting the amount of access used by the second device from said request amount of access to determine the part of said requested amount of access that is unused,
         receiving back from said second device at least part of said requested amount of access that is unused by said second device, based upon results of the verification by the second device,
         verifying, by the first device, that said right and said available amount of access are not modified without authorization, and
         merging the part of said requested amount of access that is unused by the second device based upon results of the verification by the first device.

2. The method of digital rights management as claimed in claim 1, wherein said first device comprises a right encryption key, and further comprising an act of:
   transferring said right encryption key to said second device via said communication channel.

3. The method of digital rights management as claimed in claim 1, further comprising an act of: transferring said digital data content to said second device via said communication channel.

4. The method of digital rights management as claimed in claim 1, further comprising an act of: securing said communication channel.

5. The method of digital rights management as claimed in claim 1, further comprising an act of: protecting the integrity of the available amount of access.

6. The method of digital rights management as claimed in claim 1, further comprising an act of: protecting the integrity of said requested amount of access by said second device.

7. A method of right management as claimed in claim 1, said method further comprising the step of: securing said communication channel.

8. A method of right management as claimed in claim 1, said method further comprising the step of: removing said right from said second device.

9. A first device far digital rights management of digital data content, the first device connected to at least one second device via a communication channel and comprising a digital right for accessing said digital data content and available amount of access to said digital data content, said first device comprising:
- a receiving unit for receiving a request from the second device for a portion of the amount of access to the digital data content;
- a comparing unit for comparing the requested portion of the amount of access with said available amount of access;
- a selecting unit for when the requested portion of the amount of access is within said available amount of access, deducting said requested portion of the amount of access from said available amount of access;
- a transferring unit for transferring said requested amount of access to said second device via the communication channel;
- a duplicating unit for duplicating said digital right for accessing said digital data content to said second device as a second digital right;
- a first verifying unit for verifying, by said second device, that said second digital right and an amount of access used by the second device are not modified without authorization;
- a returning unit for returning from said second device at least a part of said requested amount of access that is unused by said second device based upon results of the first verification unit;
- a receiving unit for receiving back from the returning unit of said device at least part of said requested amount of access that is unused by said second device;
- a second verification unit for verifying that said right and said available amount of access are not modified without authorization; and
- a merging unit for merging the part of said requested amount of access that unused by the second device with said available amount of access based upon results of the verification by the second verification unit.

* * * * *